United States Patent
Shaw

[11] Patent Number: 5,609,241
[45] Date of Patent: Mar. 11, 1997

[54] TRAINING IDLER ASSEMBLY FOR A CONVEYOR SYSTEM

[75] Inventor: Grover P. Shaw, Paonia, Colo.

[73] Assignee: Atlantic Richfield Company, Los Angeles, Calif.

[21] Appl. No.: 408,773

[22] Filed: Mar. 23, 1995

[51] Int. Cl.⁶ .................................................. B65G 39/16
[52] U.S. Cl. .............................................. 198/806; 226/23
[58] Field of Search ................................. 198/806–808; 226/23

[56] References Cited

U.S. PATENT DOCUMENTS 3,119,535  1/1964  Hoffman ........................... 226/23
3,512,691  5/1970  Neifeld et al. ..................... 226/23
3,593,841  7/1971  Leow ................................. 198/806

Primary Examiner—Joseph E. Valenza
Attorney, Agent, or Firm—Drude Faulconer

[57] ABSTRACT

A training idler assembly for use with a conveyor belt which quickly responses to mis-tracking of the belt to thereby return the belt to its centered position. The idler roller is rigged through cables to hinged guide rollers which engage either side of the conveyor belt so that when the belt tracks either to the right or to the left, the respective guide roller actuates the appropriate cable to cause the idler roller to rotate about a vertical axis which, in turn, causes the belt to track back towards its center position on the idler roller.

6 Claims, 2 Drawing Sheets 5,609,241

TRAINING IDLER ASSEMBLY FOR A CONVEYOR SYSTEM

DESCRIPTION

1. Technical Field

The present invention relates to a training idler assembly for a conveyor system and in one of its aspects relates to a self-adjusting, training idler assembly which includes a mechanism for providing a quick response time in re-centering a conveyor belt should the belt begin to track to one side or the other.

2. Background Art

Conveyor systems designed for moving lumped or granulated material, e.g. mined coal or the like, for long distances may include several individual conveyor belts which "overlap" each other. That is, one belt moves the material along a first distance and then deposits the material onto a second belt which then carries the material a second distance, and so forth, until the material reaches its destination. Even though several belts may be used in a single conveyor system, each belt may still have to have a substantial length, e.g. 2000 to 3000 feet.

Spillage from belt conveyor systems of this type, particularly at transfer points, has been a problem for as long as these systems have used. Tracking of these belts, especially at the "tail piece" (i.e. at and near the back roller) is extremely critical in the successful operation of such systems. If a belt tracks to one side or the other as it is being loaded with the material, the weight of the load will hold the belt to that side all the way to the head roller, with spillage of material occurring along the entire travel of the belt.

This results in greatly increased labor costs for the required clean-up operation and will eventually result in a plugged tail piece which, in turn, will require the conveyor system to be shut down until clean-up and repair can be carried out. Where the conveyor system is used in coal mining, this requires the entire mining operation to be shut down during this period if there is no other way to get the coal out of the mine.

Crooked splices in a belt, imperfect alignment of return idler rollers, a belt stretched on one side, or unlevel rails or structure all contribute to off-center tracking of a belt. The longer the belt, the more difficult it is to keep it trained or centered along its travel path. With long belts, such as described above, there is a tendency for the belt to rub against the bottom roller hangers at some points along its travel path. In fact, resistance against these hangers is all that keeps the belt from tracking to the side even further. Unfortunately, however, this contact between the belt and the hangers results both in wear to the belt and damage to the hangers and, in severe cases, may even present a fire hazard.

In order to alleviate the contact between a belt and the bottom roller hangers, "training idlers" have been installed to help in re-aligning a belt as it begins to track to one side or the other. The training idler orients itself such that, if the belt tracks in the center of the travel path, the idler will remain substantially perpendicular to the centerline of the travel path of the belt. However, (looking down on the belt and in the direction of belt travel), if the belt tracks to the right, the idler will rotate counter-clockwise in the horizontal plane about its center which tends to draw the belt back to the left, thereby re-centering the belt along its path. If the belt tracks to the left, the idler rotates clockwise to again re-center the belt.

Unfortunately, known prior art training idlers routinely experience problems when a conveyor belt is less than full width and is fully loaded from side to side with the material to be transported. For example, known training idlers have a slow response time when a belt moves significantly off track. That is, the belt can track significantly to one side (e.g. two or more inches) before it touches a side roller and then will move even further as it pushes against that side roller to correct the tracking of the belt. This will often result in substantial spillage of the material from the belt before the prior art, training idlers react to re-center the belt.

Further, for existing training idlers to be effective, the belt must be substantially full width along its entire length. For example, in an actual mining operation, a long conveyor belt had approximately 5 inches of its width ripped off one side along several hundred feet of its length when a misalignment at the head end of the belt caused a sharp edge of steel to cut the belt. Because of the reduced width and the resulting movement of the belt back and forth across the tail roller during travel, the belt could no longer adequately carry coal. Every two to three weeks, the tail piece would plug and would cause the belt to go down. This required several man-hours of shoveling just to get the belt moving again with several additional man-hours required to remove the remaining spillage.

SUMMARY OF THE INVENTION

The present invention provides a training idler assembly for use with a conveyor belt system which quickly responds to any side-to-side misalignment of the belt to thereby return the belt to its centered position on the idler roller of the idler assembly. Basically, the idler roller is rigged through cables to hinged guide rollers which engage either side of the conveyor belt as the belt travels along its path. If the belt tracks either to the right or to the left, the respective guide roller actuates the appropriate cable to cause the idler roller to rotate about a vertical axis which, in turn, causes the belt to track back towards its center position on the idler roller.

More specifically, the present training idler assembly is comprised of a fixed support having a pair of hinged arms mounted thereon about vertical axes, one on either side of the fixed support. Each arm carries a guide roller which is adapted to ride against the respective sides of the conveyor belt while the belt is in operation.

A carriage carrying an idler roller is pivotably mounted on the fixed support about a vertical axis. The idler roller will engage the lower surface of the conveyor belt to support and guide the belt while the belt is moving. The carriage, hence the idler roller, is rotated about its vertical axis by a pair of symmetrically-rigged cables, the lengths of which may be adjusted by a turnbuckle or the like.

Each cable is attached at one end to one respective side of the carriage and passes (a) through a sheave mounted on same one side of the fixed support; (b) back through a sheave mounted on the same side of the carriage; (c) back through a second sheave mounted on the same side of the fixed support; (d) through a sheave mounted on the hinged arm, which is on the same side of the fixed support, and (e) finally through a third sheave which is mounted on the fixed support. A single, freely-suspended weight is then attached to both of the other ends of the cables.

Since the rigging is identical on either side of the trainer idler assembly and each cable terminate at the same weight, the tension in cable will tend to keep each of the respective guide rollers in firm contact with the respective edges of belt. If the belt begins to track to one side, it will begin to push the respective guide roller on that side outwardly whereupon the cable on that side will tend to lift the common weight thereby increasing tension in that cable while decreasing the tension in the cable on the other side. This tension is be multiplied through the "block and tackle" arrangement of the cable rigging and will thereby exert a force onto the carriage which is several times that of the weight alone. This causes the carriage, hence the idler roller, to rotate in the opposite direction to counteract the mis-tracking of the belt and move the belt back towards its centered position.

BRIEF DESCRIPTION OF THE DRAWINGS

The actual construction, operation, and apparent advantages of the present invention will be better understood by referring to the drawings in which like numerals identify like parts and in which.

BEST KNOWN MODE FOR CARRYING OUT THE INVENTION

Figure 1:
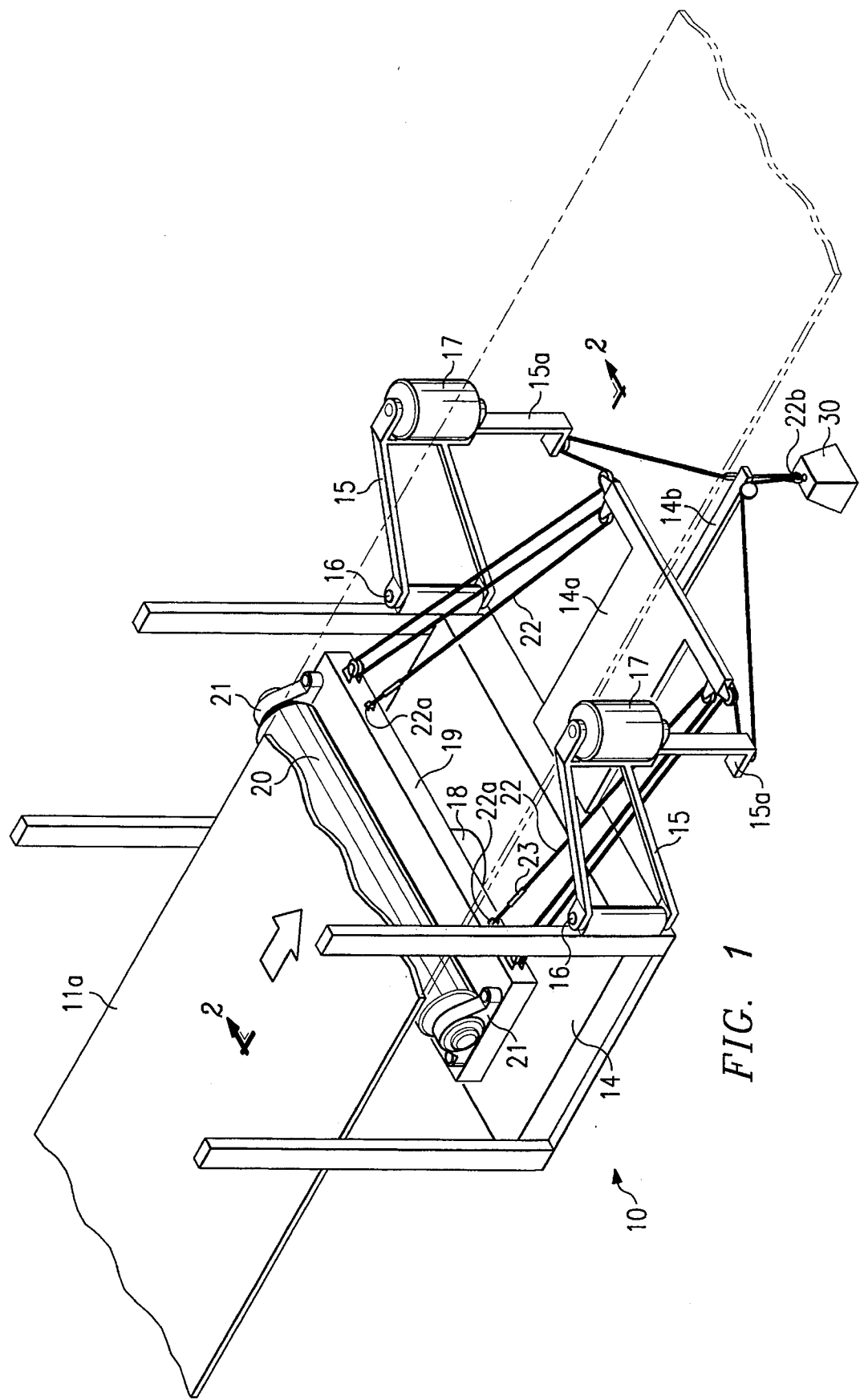
FIG. 1 is a perspective view of the training idler assembly in accordance with the present invention with the conveyor belt being broken away.
Figure 2:
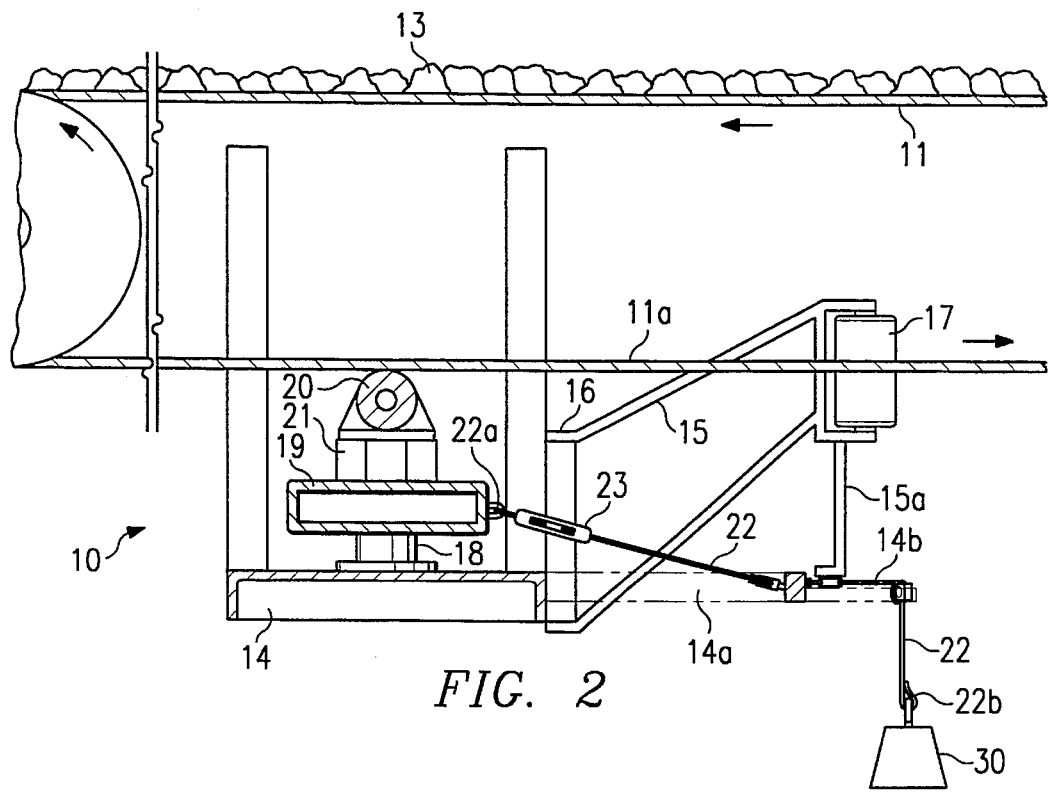
FIG. 2 is a sectional view taken along line 2—2 of FIG. 1 but including an upper portion of the conveyor belt not shown in FIG. 1.

Referring more particularly to the drawings, FIGS. 1–3B illustrate a training idler assembly 10 in accordance with the present invention when in an operable position with respect to a conveyor belt 11. As best seen in FIG. 2 and will be understood by those skilled in the art, conveyor belt 11 is a continuous belt which passes over a head roller 12 and a tail roller (not shown) and travels in the direction of the arrows while carrying lumped or granular material 13 (e.g. mined coal). In the following description of the invention, the terms "right", "left", "front", "back", "head", "tail", etc. are used in their relative sense and will applied as if one is looking down on the belt and in the direction of the belt travel.

Training idler 10 is comprised of a support 14 which is affixed to a permanent base (not shown) so that the fixed support 14 will not move. Fixed support 14 has a pair of hinged arms 15 pivotably mounted thereon about vertical axes 16, one on either side of the support as shown in the drawings. Rotatably mounted on each arm 15 is a guide roller 17. The guide rollers 17 are adapted to ride against the respective sides of the return portion of belt 11a at all times during belt operation.

Pivotably mounted on fixed support 14 about a vertical axis 18 is carriage 19. Idler roller 20 is mounted for rotation on carriage 19 by bearing blocks 21 or the like. As shown, roller 20 engages the lower surface of the return portion 11a of belt 11 to support and guide said belt during its travel but can also be positioned under the upper portion or conveying portion of the belt, as will be understood in the art. Carriage 19 is moved or rotated about its vertical axis 18 by a pair of symmetrically-rigged cables 22. Since each of which follows a identical "block-and-tackle" rigging path on different sides of the idler assembly 10, only one will be described in detail below.

Each cable 22 is attached at one (22a) of its ends to carriage 19, one cable being attached to on one (e.g. right) side of carriage 19 and the other cable being attached to the other (e.g. left) side of the carriage. Turnbuckles 23 or the like may be provided in the respective cables 22 to adjust the lengths thereof. Each cable 22 is passed (a) through a respective sheave or pulley 24 which is mounted on the same respective side of an extending portion 14a of fixed support 14; (b) through a sheave or pulley 25 which is mounted on the same side of said carriage 19; (c) back through a second sheave or pulley 26 mounted on said same respective side of said fixed support portion 14a; (d) through a sheave or pulley 27 which is mounted on an extending portion 15a of the respective hinged arm 15 and (e) finally through a third sheave or pulley 28 which is mounted on a further extension 14b of fixed support 14. The other ends 22b of cables 22 are both connected to the same single freely, suspended weight 30.

Since the rigging is identical on either side of the trainer idler assembly and each cable 22 is connected to the same weight 30, the tension in cable 22 equals approximately half of weight 30 which tends to keep guide rollers 17 against the respective edges of belt 11a. If the need ever arises, the length of each cable 22 may be varied via turnbuckles 23 to intentionally align belt 11 off of the centerline of the conveyor system.

Figures 3A, 3B:
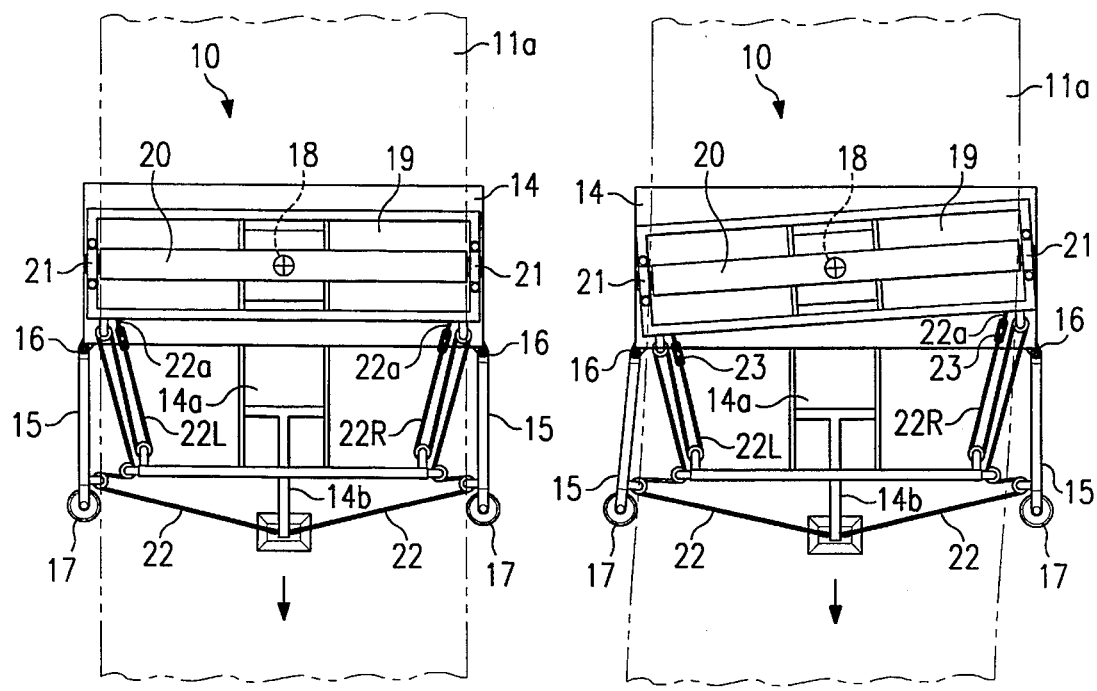
FIG. 3A is a top view of the training idler assembly of FIG. 1 as it appears when the conveyor belt is in its centered position on said idler roller.
FIG. 3B is a top view of the training idler assembly of FIG. 1 when the conveyor belt has tracked to one side.

In operation, if belt 11 begins to track to one side (e.g. to the left as shown in FIG. 3B), the left edge of the belt 11a will begin to push the left side guide roller 17 outward whereupon left side cable 22L will tend to lift weight 30 thereby increasing tension in cable 22L while right side cable 22R slackens. The line tension is multiplied through the "block and tackle" effect of the cable rigging and exerts a force of several (theorically three) times that of the weight 30 onto carriage 19 to cause it to rotate in the opposite direction about its vertical axis 18 (clockwise in FIG. 3B) to counteract the mis-tracking of the belt. As carriage 19 rotates back to its desired position (i.e. perpendicular to the longitudinal axis of belt 11) belt 11 will realign to its centered position (FIG. 3A).

What is claimed is:

1. A trainer idler assembly for a conveyor belt, said assembly comprising:

a support;

an idler roller means pivotably mounted on said support for movement about a vertical axis, said idler roller means adapted engage said conveyor belt;

guide roller means pivotably mounted on either side of said support for movement about vertical axes and adapted to engage the respective sides of the conveyor belt when the belt is in engagement with said idler roller means;

means for moving said idler roller about its vertical axis in response to said conveyor belt tracking away from its centered position on said idler roller means and against a respective guide roller means to thereby cause the belt to move back towards its centered position on said idler roller means wherein said means for moving said idler roller means about its vertical axis comprises:

a pair of cables, each cable being symmetrically-rigged with one end being connected to a respective side of said idler roller means, said each cable then passing through respective sheaves on said support, said idler roller means, and said respective guide roller means, and each of said cables having its other end connected to a single, freely-suspended weight.

2. The training idler assembly of claim 1 wherein said means for moving said idler roller means about its vertical axis comprises:

a pair of symmetrically-rigged cables, each cable having one end connected to one respective side of said idler roller means and passing (a) through a first sheave mounted on said support; (b) back through a respective sheave mounted on said idler roller means; (c) back through a second sheave mounted on said support; (d) through a sheave on said guide roller means, and (e) through a third respective sheave mounted on said support; and a single freely, suspended weight connected to the other end of both of said cables.

3. A trainer idler assembly for a conveyor belt, said assembly comprising:

a fixed support;

a carriage pivotably mounted on said fixed support about a vertical axis;

an idler roller rotatably mounted on said carriage and adapted to engage said conveyor belt;

a pair of arms, one arm being pivotably mounted on one side of said fixed support and the other arm being pivotably mounted on the other side of said fixed support;

a guide roller rotatably mounted on each arm and adapted to engage a respective side of the conveyor belt when the belt is in engagement with said idler roller;

means for rotating said carriage about its vertical axis on said fixed support when one of said arms is pivoted outward by movement of the conveyor belt tracking away from its centered position on said idler roller whereby said idler roller is rotated with said carriage to thereby cause the belt to move back towards its centered position on said idler roller wherein said means for rotating said carriage comprises:

a pair of symmetrically-rigged cables, each cable having one end being connected to a respective side of said carriage, said cable then passing through respective sheaves on said fixed support, said carriage, and said respective arm, each of said cables having its other end connected to a single, freely-suspended weight.

4. The training idler assembly of claim 3 wherein said means for rotating said carriage comprises:

a pair of symmetrically-rigged cables, each cable having one end connected to one respective side of said carriage and passing (a) through a first sheave mounted on the same respective side of said fixed support; (b) back through a sheave mounted on said respective side of said carriage; (c) back through a second sheave mounted on said respective side of said fixed support; (d) through a sheave on a respective arm and (e) through a third sheave mounted on said fixed support; and a single freely, suspended weight connected to the other end of both of said cables.

5. The training idler assembly of claim 4 including:

means for adjusting the length of each of said cables.

6. The training idler assembly of claim 5 wherein said means for adjusting the length of each said cables comprises:

a turnbuckle connected within said cable.

* * * * *